United States Patent Office 3,297,679
Patented Jan. 10, 1967

3,297,679
PRODUCTION OF AZO DYES
Dieter Leuchs, Ludwigshafen (Rhine), Germany, assignor to Badische Anilin- & Soda-Fabrik Aktiengesellschaft, Ludwigshafen (Rhine), Germany
No Drawing. Filed Aug. 15, 1963, Ser. No. 302,445
7 Claims. (Cl. 260—206)

This invention relates to a new process for the production of azo compounds from 2-hydrazones of 1,2,3-trioxo compounds.

Numerous azo dyes having a phenolic coupling component are known. They are usually obtained by coupling a diazo compound with a phenol. Only a few azo dyes have been described however which contain a phenol substituted on the benzene ring. With a few exceptions, such as o-cresol, m-cresol or o-phenylphenol, substituted phenols which are capable of coupling cannot be prepared or can only be prepared with great difficulty. Therefore azo dyes suitable for the production of certain substituted aminophenols by reductive cleavage of azo dyes containing phenol coupling components have hitherto not been available in practice.

It is the object of the present invention to provide a process by means of which azo compounds may readily be prepared which contain a phenol component bearing alkyl, aryl or aralkyl radicals as substituents.

This object is achieved in accordance with this invention by preparing azo compounds having the general formula:

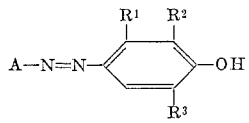

in which A denotes the radical of a diazotizable amino compound and $R^1$, $R^2$ and $R^3$ may be identical or different and denote hydrogen atoms, alkyl radicals, preferably alkyl radicals having one to four carbon atoms, aryl radicals, preferably phenyl radicals, or aralkyl radicals, by condensation of a hydrazone having the general formula:

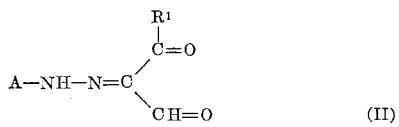

with a ketone having the general formula:

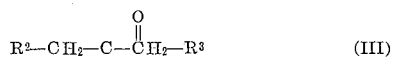

in which A, $R^1$, $R^2$ and $R^3$ have the meanings given above, in the presence of a basic condensing agent.

A particular object of the invention is the production of compounds having the Formula I in which $R^1$, $R^2$ and $R^3$ denote methyl radicals and A preferably denotes the radical of a diazotizable amine of the benzene series.

These compounds are suitable for a simple synthesis, proceeding particularly uniformly, of trimethylhydroquinone which is an intermediate for the production of tocopherol. This is explained in greater detail below.

Hydrazones having the Formula II which are used as initial materials for the production of the azo compounds have been described in the literature. They are obtained for example by coupling aliphatic or araliphatic 1,3-dihydroxy compounds or their functional derivatives, such as enol ethers, enamines or acetalenol ethers, with diazonium compounds (see L. Claisen, Ber., 36, 3668 (1903); L. Claisen, Ber., 21, 1697–1705 (1888); German patent specification No. 947,468). Starting compounds which have not yet been described may be prepared analogously to the known compounds. The radical A in Formula II may be the radical of any diazotizable aromatic-isocyclic or aromatic-heterocyclic amine.

The 2-phenyl hydrazones of propanone-(2)-dial-(1,3), of butanedione-(2,3)-al and of 3-phenylpropanedione-(2,3)-al which may bear alkyl radicals having one to four carbon atoms, alkoxy radicals having one to four carbon atoms, phenylazo groups, sulfonic acid groups, nitro groups or halogen atoms as substituents in the phenyl radical may however be used with particular advantage as initial materials for the new process.

Examples of ketones having the Formula III are acetone, butanone-(2), pentanone-(2), pentanone-(3), hexanone-(2), heptanone-(3), heptanone-(4), 2,6-dimethylheptanone-(4), phenylacetone and 1,3-diphenylacetone.

Examples of basic condensing agents for the reaction according to this invention are alkali metal hydroxides, alkaline earth metal hydroxides, alkali metal alcoholates, alkali metal carbonates and tertiary aliphatic amines. They are advantageously used in at least a 0.5-molar amount and preferably in a 1-molar amount. Larger amounts of condensing agent may be used but there is no further acceleration of the reaction in consequence.

The condensation yielding the azo compounds is carried out in water and/or organic solvents, such as aliphatic alcohols, dialkylformamides, or in an excess of the ketone component having the Formula III, depending on the solubility characteristics of the reactants. The condensation will proceed within a wide temperature range, for example between 0° and 150° C. Since at 100° C., however, appreciable amounts of byproducts and decomposition products begin to form, the condensation is advantageously carried out in the range from 10° to 50° C.

The azo compounds formed according to this invention may be deposited and isolated by conventional methods by neutralization of the basic condensing agent with acids and if necessary by dilution of the reaction mixture with water. Products containing sulfonic acid groups can usually be isolated merely by salting out from the reaction mixture.

The azo compounds obtainable according to the process may be used as intermediates for the production of p-aminophenols and their secondary products, such as quinones and hydroquinones. In particular, as already mentioned, trimethylhydroquinone may be readily prepared from an azo compound having the Formula I in which $R^1$, $R^2$ and $R^3$ denote methyl groups.

Prior art methods for the production of trimethylhydroquinone usually start from 1,2,4-trimethylbenzene (pseudocumene) present in coal tar and which already contains the methyl groups in the correct positions. The diculties of this method of preparation consist in introducing into each of the 3- and 6-positions a hydroxyl group or a substituent convertible into a hydroxyl group. Since the 5-position in 1,2,4-trimethylbenzene is the first to be occupied by freshly introduced substituents, this position must first be blocked by a substituent which can later be eliminated. For this purpose it has hitherto been usual to introduce a sulfonic acid group (Pongratz, Zirm, Monatsh., 83 (1952), 13) or a bromine atom (Hui, J. Vitaminology, 1 (1954), 8).

It has also been proposed to convert 2,3,5-trimethylphenol into the hydroquinone by coupling with diazonium salts, reductive cleavage, oxidation to the quinone and reduction to the hydroquinone (Smith et al., J. Org. Chem., 4 (1939), 318). According to another proposal, the same phenol is converted into the trimethylhydroquinone by nitrosation, hydrolysis of the nitrosophenol and reduction of the quinone (Boscott, Chem. and Ind., 1955, 201). The 2,3,5-trimethylphenol required for these methods cannot however be prepared from 1,2,4-trimethylbenzene direct and free from isomers because of the preferential substitution of the 5-position of 1,2,4-trimethylbenzene.

The said methods consequently necessitate a number of steps and therefore give low total yields.

In contrast we have found that trimethylhydroquinone can be prepared advantageously and in high yields by converting an azo compound having the formula:

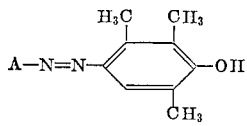

in which A has the meanings given above, obtainable by the process according to this invention, into trimethylhydroquinone by reductive cleavage, oxidation to the quinone and reduction to the hydroquinone.

The course of the reaction may be represented by the following equations:

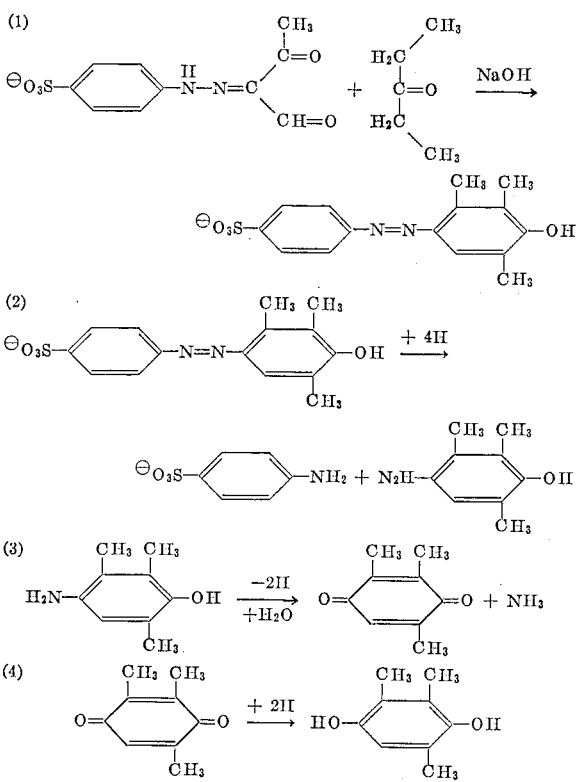

The hydrazone compound is condensed in aqueous solution with diethyl ketone in the presence of a basic condensing agent to a compound containing a 2,3,5-trimethyl-4-hydroxyazo radical (1). Alkali metal hydroxides, alkaline earth metal hydroxides, alkali metal carbonates, alkali metal alcoholates and tertiary aliphatic amines, used in at least 0.5-molar amounts, are for example suitable as condensing agents.

The hydroxyazo compound thus prepared is then reductively split to the aminophenol, for example in mineral acid solution with zinc or stannous salts or in neutral or weakly alkaline solution with sodium dithionite (2). Acid reduction is most advantageous industrially; it is expedient to use sulfuric acid for the purpose. The use of hydrochloric acid would give, in the subsequent oxidation of the aminophenol (which can be carried out in the same reaction medium without isolation of the intermediate product), chlorotrimethylbenzoquinone by addition of hydrochloric acid to the trimethylquinone formed, instead of giving trimethylbenzoquinone. For the same reason the oxidation (3) is advantageously carried out with ferric sulfate rather than with ferric chloride which is conventionally used. The trimethylbenzoquinone formed is isolated from the reaction mixture, for example by steam distillation.

Reduction (4) of the trimethylbenzoquinone to trimethylhydroquinone may be effected for example in aqueous suspension with sulfurous acid, alkali metal sulfites, alkali metal bisulfites or sodium dithionite, if desired with the addition of an inert organic solvent which is not miscible with water, such as benzene, chlorobenzene, chloroform or methylene chloride. The aqueous suspension of trimethylbenzoquinone may be the steam distillate from the preceding stage. The trimethylhydroquinone obtained is very pure.

The invention is further illustrated by the following Examples in which parts are by weight unless otherwise stated. Parts by weight bear the same relation to parts by volume as the kilogram to the liter (S.T.P.). The percentages are also by weight.

*Example 1*

176 parts of mesoxaldialdehyde monophenylhydrazone is stirred into 1000 parts by volume of ethyl alcohol and then 95 parts of diethyl ketone and 440 parts of 10% caustic soda solution are added. The reaction mixture is boiled for three hours under reflux and then cooled to room temperature. It is then neutralized with 10% hydrochloric acid and the deposited dye is filtered off by suction. 185 parts of the dye having the formula:

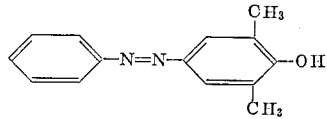

is obtained.

If the reaction is carried out at room temperature, stirring must be continued for twelve hours to complete the conversion.

If the ethyl alcohol in the above example be replaced by methyl alcohol and the caustic soda by an equivalent amount of caustic potash, the dye is obtained in almost the same yield.

The following dyes are obtained in the same way:

| Ex. No. | Phenyl hydrazone | Ketone | End product |
|---|---|---|---|
| 2 | ⌬-NH-N=C(CHO)(CHO) | Acetone | ⌬-N=N-⌬-OH |
| 3 | Same as above | Methyl ethyl ketone | ⌬-N=N-⌬(CH₃)-OH |

| Ex No. | Phenyl hydrazone | Ketone | End product |
|---|---|---|---|
| 4 | Same as above | Diisobutyl ketone. | 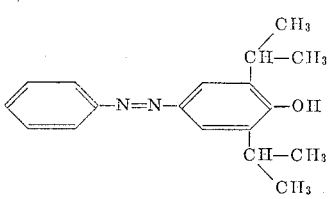 |
| 5 | Same as above | Methyl benzyl ketone. | 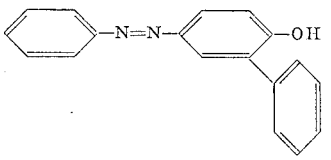 |
| 6 | Same as above | Dibenzyl ketone. | 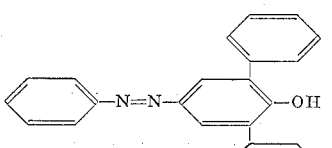 |
| 7 | 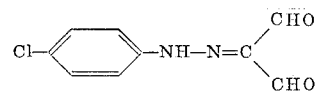 | Diethyl ketone. | 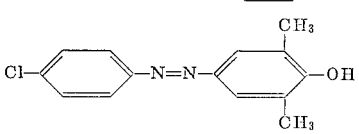 |
| 8 | 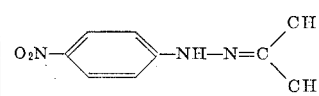 | Methylethyl ketone. | 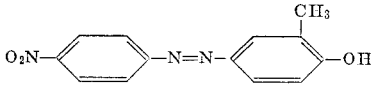 |
| 9 | 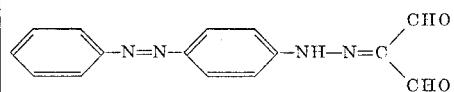 | Dibenzyl ketone. | 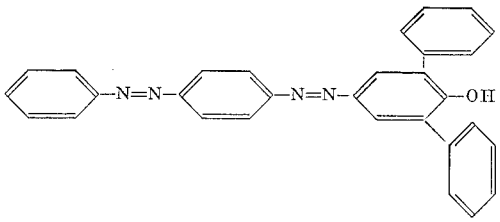 |
| 10 | 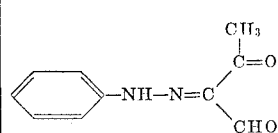 | Diethyl ketone. | 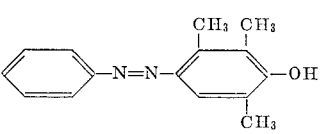 |
| 11 | 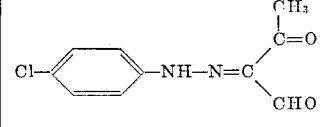 | ___do___ | 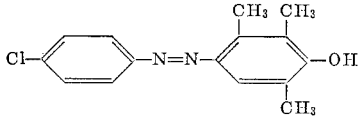 |
| 12 | 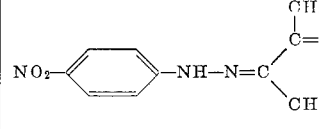 | Diethyl ketone. | 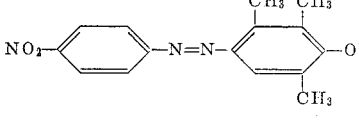 |
| 13 | 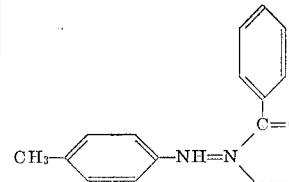 | ___do___ | 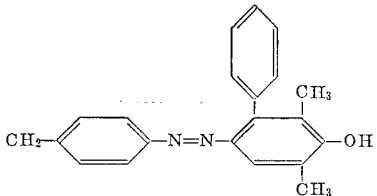 |

Example 14

292 parts of butanedione-(2,3)-al-(4-sulfophenyl)-hydrazone is dissolved in 1000 parts of water with the addition of 80 parts of caustic soda. 95 parts of diethyl ketone is added and the whole stirred at 25° to 30° C. until the initial compound cannot be detected by paper chromatography. The reaction mixture is neutralized with acetic acid and the dye salted out with common salt. After filtration by suction and drying, 320 parts of the dye having the formula:

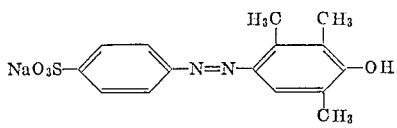

is obtained.

The hydroxyazo dye thus obtained is converted into trimethylhydroquinone as follows:

The dye is stirred with 2000 parts of 20% sulfuric acid, 1 part of mercuric chloride is added and reduction is effected by introducing 160 parts of zinc dust in portions. The temperature of the reaction mixture thereby rises to the boiling point. After the last portion of zinc has been added, the whole is boiled for about an hour under reflux while stirring until a clear solution is obtained. The solution is then transferred to a steam distillation apparatus, a solution of 400 parts of ferric sulfate is added and the trimethylbenzoquinone formed is distilled off with steam. Without isolating the oily quinone, half the volume of benzene is added to the distillate and the quinone is reduced by scattering 300 parts of sodium dithionite therein while stirring vigorously. The trimethylhydroquinone which has crystallized out is filtered off by suction, washed with ice-water and dried at 40° C. under subatmospheric pressure. 92 parts of trimethylhydroquinone having a melting point of 172° C. is obtained. The yield, with reference to the azo dye used, is 65% of the theory. The melting point rises to 174° C. after a single recrystallization from hot water.

Using the same process as described in paragraph 1 of this example, the following p-hydroxyazo compounds are obtained from the initial compounds specified:

| Example No. | Phenyl hydrazone | Ketone | End product |
|---|---|---|---|
| 15 | NaO₃S—⟨⟩—NH—N=C(CHO)(CHO) | Acetone | NaO₃S—⟨⟩—N=N—⟨⟩—OH |
| 16 | Same as above | Methyl ethyl ketone | NaO₃S—⟨⟩—N=N—⟨⟩(CH₃)—OH |
| 17 | Same as above | Diethyl ketone | NaO₃S—⟨⟩—N=N—⟨⟩(CH₃)—OH, (CH₃) |
| 18 | Same as above | Methyl butyl ketone | NaO₃S—⟨⟩—N=N—⟨⟩—OH, (C₃H₇) |
| 19 | Same as above | Dipropyl ketone | NaO₃S—⟨⟩—N=N—⟨⟩(C₂H₅)—OH, (C₂H₅) |
| 20 | Same as above | Dibenzyl ketone | NaO₃S—⟨⟩—N=N—⟨⟩(C₆H₅)—OH, (C₆H₅) |
| 21 | NaO₃S—⟨⟩—NH—N=C(CH₃C=O)(CHO) | Acetone | NaO₃S—⟨⟩—N=N—⟨⟩(CH₃)—OH |
| 22 | Same as above | Methyl ethyl ketone | NaO₃S—⟨⟩—N=N—⟨⟩(CH₃)—OH, (CH₃) |
| 23 | Same as above | Methyl benzyl ketone | NaO₃S—⟨⟩—N=N—⟨⟩(CH₃)—OH, (C₆H₅) |

| Example No. | Phenyl hydrazone | Ketone | End product |
|---|---|---|---|
| 24 | 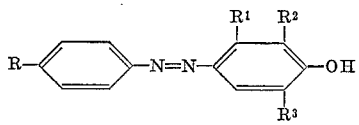 | Acetone | 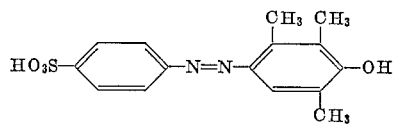 |
| 25 | Same as above | Diethyl ketone | 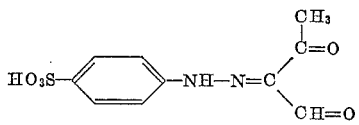 |

Instead of caustic soda solution as the condensing agent, there may be used caustic potash solution, sodium carbonate or potassium carbonate or, when working in an anhydrous medium, sodium methoxide or sodium ethoxide with the same result.

I claim:

1. A process for the production of azo compounds of the formula

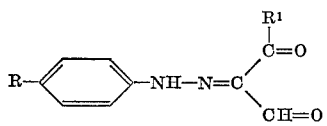

where R represents a member selected from the class consisting of hydrogen, halogen, alkyl of 1 to 4 carbon atoms, alkoxy of 1 to 4 carbon atoms, nitro, sulfonic acid and phenylazo, and $R^1$, $R^2$ and $R^3$ are members selected from the class consisting of hydrogen, alkyl of 1 to 4 carbon atoms and phenyl, which process comprises: condensing a hydrazone of the formula

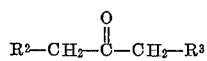

with a ketone of the formula $$R^2-CH_2-\overset{\overset{O}{\|}}{C}-CH_2-R^3$$

where $R^1$, $R^2$, $R^3$ and R have the same meanings as above, in an aqueous or organic solution at a temperature from about 0° to 150° C. in the presence of a basic condensing agent selected from the class consisting of alkali metal hydroxides, alkaline earth metal hydroxides, alkali metal alcohoaltes, alkali metal carbonates and tertiary aliphatic amines.

2. A process as claimed in claim 1 wherein $R^1$, $R^2$ and $R^3$ each represent methyl.

3. A process as claimed in claim 1 wherein the temperature is about 10° to 100° C.

4. A process as claimed in claim 2 wherein the temperature is about 10° to 100° C.

5. A process as claimed in claim 4 wherein the ketone is diethyl ketone.

6. A process for the production of the azo compound of the formula

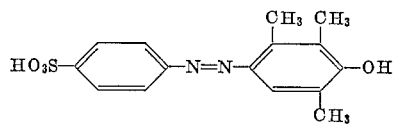

which comprises: condensing at about 10° to 100° C. the hydrazone of the formula

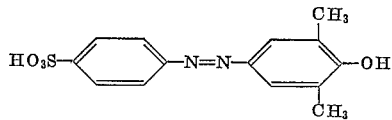

with diethyl ketone in an aqueous or organic solution in the presence of a basic condensing agent selected from the class consisting of alkali metal hydroxides, alkaline earth metal hydroxides, alkali metal alcoholates, alkali metal carbonates and tertiary aliphatic amines.

7. A process for the production of the azo compound of the formula

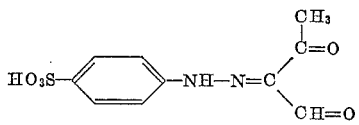

which comprises: condensing at about 10° to 100° C. the hydrazone of the formula

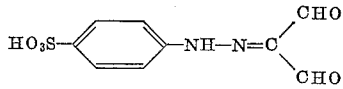

with diethyl ketone in an aqueous or organic solution in the presence of a basic condensing agent selected from the class consisting of alkali metal hydroxides, alkaline earth metal hydroxides, alkali metal alcoholates, alkali metal carbonates and tertiary aliphatic amines.

No references cited.

CHARLES B. PARKER, *Primary Examiner.*

JOSEPH P. BRUST, *Examiner.*

F. D. HIGEL, *Assistant Examiner.*

UNITED STATES PATENT OFFICE
CERTIFICATE OF CORRECTION

Patent No. 3,297,679                               January 10, 1967

Dieter Leuchs

It is hereby certified that error appears in the above numbered patent requiring correction and that the said Letters Patent should read as corrected below.

In the heading to the printed specification, after line 6, insert -- Claims priority, application Germany, August 23, 1962 B 68 547 --; column 3, under the heading Phenyl hydrazone, last line, for "tbove" read -- above --; column 9, line 59, for "alcohoaltes" read -- alcoholates --.

Signed and sealed this 17th day of October 1967.

(SEAL)
Attest:

Edward M. Fletcher, Jr.                      EDWARD J. BRENNER
Attesting Officer                            Commissioner of Patents